US008803036B2

(12) United States Patent
Niederer et al.

(10) Patent No.: US 8,803,036 B2
(45) Date of Patent: Aug. 12, 2014

(54) ELECTRIC HEATING DEVICE FOR A MOTOR VEHICLE

(75) Inventors: Michael Niederer, Kapellen-Drusweiler (DE); Franz Bohlender, Kandel (DE); Kurt Walz, Hagenbach (DE)

(73) Assignee: Eberspacher Catem GmbH & Co. KG, Herxheim Bei Landau (DE)

( * ) Notice: Subject to any disclaimer, the term of this patent is extended or adjusted under 35 U.S.C. 154(b) by 979 days.

(21) Appl. No.: 12/728,324

(22) Filed: Mar. 22, 2010

(65) Prior Publication Data

US 2010/0243638 A1 Sep. 30, 2010

(30) Foreign Application Priority Data

Mar. 30, 2009 (EP) .................................... 09004596

(51) Int. Cl.
*B60L 1/02* (2006.01)
*H05B 3/44* (2006.01)

(52) U.S. Cl.
USPC ............................ 219/202; 219/542; 219/544

(58) Field of Classification Search
USPC .......................................... 219/542, 544, 202
See application file for complete search history.

(56) References Cited

U.S. PATENT DOCUMENTS 6,392,207 B2 * 5/2002 Beetz et al. ................... 219/530
7,148,453 B2 * 12/2006 Bohlender et al. ............ 219/491
2004/0112884 A1 * 6/2004 Uhl et al. ...................... 219/202
2005/0173394 A1 * 8/2005 Bohlender et al. ............ 219/202
2007/0012478 A1 * 1/2007 Nasstrom et al. ............. 174/354

FOREIGN PATENT DOCUMENTS

EP 1 516 112 A2 12/1992
EP 1 580 495 A1 9/2005
WO 02/057100 A2 7/2002

OTHER PUBLICATIONS

European Search Report Dated Jun. 9, 2009 for European Patent Application Serial No. EP 09 00 4596.

* cited by examiner

*Primary Examiner* — Nitin Parekh
(74) *Attorney, Agent, or Firm* — Boyle Fredrickson, S.C.

(57) ABSTRACT

An electric heating device for a motor vehicle includes at least one PTC heating element with contact metal sheets extending substantially parallel to one another and accommodating between them at least one PTC element, and a printed circuit board. The printed circuit board has formed therein at least one opening through which a contact tongue projects. The contact tongue serves to establish an electric connection between the PTC heating element and the printed circuit board. For providing an electric heating device having a compact structural design, a punched-out connection piece connected to a conductor path of the printed circuit board in an electrically conductive manner. The connection piece defines a fixing portion which rests on the printed circuit board, and also defines and at least one spring tongue projecting into the opening.

13 Claims, 4 Drawing Sheets

ELECTRIC HEATING DEVICE FOR A MOTOR VEHICLE

BACKGROUND OF THE INVENTION

1. Field of the Invention

The present invention relates to an electric heating device for a motor vehicle, comprising at least one PTC heating element with contact metal sheets extending substantially parallel to one another and accommodating between them at least one PTC element, and a printed circuit board having formed therein at least one opening through which a contact tongue projects, which is defined by a contact metal sheet and which serves to establish an electric connection between the PTC heating element and the printed circuit board.

2. Description of the Related Art

Such electric heating devices, which are also referred to as PTC heating devices, are used in motor vehicles for the purpose of heating. EP 1 157 867, for example, discloses an electric heating device in which a plurality of heat-generating elements are accommodated in a frame, said heat-generating elements being defined by two contact metal sheets extending parallel to one another and by PTC elements successively arranged between said contact metal sheets in one plane. These heat-generating elements are provided in alternating sequence with heat-emitting elements. The thus defined layered structure is held in a pretensioned manner in a frame.

Selected ones of these contact metal sheets of the individual heat-generating elements are laterally extended beyond the heating block so as to provide contact tongues for electrically connecting thereto the heating block. In EP 1 157 867 these contact tongues extend through openings in a printed circuit board populated with components. On the side facing away from the heating block, the printed circuit board carries a spring element which projects beyond the printed circuit board, said spring element clamping the contact lug and effecting electric contacting with the printed circuit board.

A similar structural design with respect to contacting between the contact tongue and the printed circuit board is known from EP 1 872 986. In the case of this prior art, two respective contact metal sheets accommodate between them a plurality of PTC elements that are stacked one on top of the other. The resultant heat-generating element is pretensioned by a wedge element acting from outside, said wedge element resting on a pocket and being forced into said pocket, so that the individual layers abut on one another in good contact with one another. Hence, the wedge element has the function of a spring by means of which the layered structure is held in a pretensioned manner within the frame in the case of EP 1 157 867 A1. Also in EP 1 872 986 the contact tongues defined by the contact metal sheets extend through openings in the printed circuit board so as to be clamped in position in spring elements projecting beyond the printed circuit board on the back facing away from the heat-generating elements.

SUMMARY OF THE INVENTION

The present invention is based on the problem of providing an electric heating device having a compact structural design.

For solving this problem, the present invention provides an electric heating device having at least one PTC heating element with contact metal sheets extending substantially parallel to one another and accommodating between them at least one PTC element, and a printed circuit board having formed therein at least one opening through which a contact tongue projects. The central tongue is defined by a contact metal sheet which also serves to establish an electric connection between the PTC heating element and the printed circuit board. A punched-out connection piece is connected to a conductor path of the printed circuit board in an electrically conductive manner. The connection piece defines 1) a fixing portion which rests on the printed circuit board, and 2) at least one spring tongue projecting into the opening.

The printed circuit board can be any printed circuit board, irrespectively of whether it is populated with components, or whether it only comprises conductor paths for conducting current between two points. Such a conductor path can be provided e.g. for the purpose of providing electric connections on the electric heating device at a location remote from the contact metal sheets. Normally, the contact metal sheets are extended such that they extend straight beyond the heating block and through the opening in the printed circuit board. When processed by punching, contact metal sheets can also provide a plug contact which is oriented, in an arbitrary direction, at an angle relative to the longitudinal direction of the contact metal sheets of the heating block, but, for reasons of manufacturing technology, such embodiments are considered to be limited with respect to their three-dimensional size. In this connection it is also of interest that the installation space available for accommodating the electric heating device in the motor vehicle is normally limited.

This is where the present invention comes into play. The present invention suggests that, for electrically connecting the contact tongue extending through the printed circuit board, at least one spring tongue projecting into the opening should be formed. This spring tongue constitutes part of a connection piece comprising, in addition to said spring tongue, at least one fixing portion which is normally in full-area contact with the printed circuit board. This fixing portion serves, on the one hand, to fix the connection piece to the printed circuit board. On the other hand, said fixing portion is normally used for establishing an electric connection between the spring tongue and, consequently, the contact metal sheet and at least one conductor path of the printed circuit board.

Other than in the case of the prior art in which the spring element used for the purpose of holding and establishing an electric contact with the printed circuit board projects beyond the printed circuit board to a substantial extent—a circumstance in view of which the printed circuit board and the components mounted thereon have considerable dimensions in the longitudinal direction of the contact metal sheets—the spring tongue clamping the contact metal sheet is located in the opening formed in the printed circuit board for passing the contact tongue therethrough.

According to a preferred embodiment which does not lead to any substantial increase in the dimensions of the printed circuit board in the direction in which the contact metal sheets extend, the spring tongue is located essentially in the plane defined by the printed circuit board. Preferably, the spring tongue is located fully within the plane of the printed circuit board in accordance with this preferred embodiment, i.e. the free end of the spring tongue, which is normally provided on the printed circuit board side facing away from the fixing portion, does not project beyond the printed circuit board.

Preferably, the spring tongue branches directly off from the fixing portion on the level of the opening and extends from the fixing portion exclusively in the direction of the opening. A spring tongue having this type of structural design does not, or only to an insignificant extent increase the thickness of the printed circuit board. Hence, the electric connection to the contact metal sheet can be established in an extremely space-saving manner.

For establishing a contact which is as solid as possible between the spring tongue and the contact tongue, a further preferred embodiment of the present invention suggests that the free end of the spring tongue should rest on a printed circuit board wall surrounding the opening. This wall extends normally at right angles to the upper and lower surface of the printed circuit board. A spring tongue supported in this way will be able to apply a comparatively high clamping force to the contact tongue, whereby a better contact between the contact tongue and the spring tongue will be established.

With respect to a defined contact area between the spring tongue and the contact tongue, a further preferred embodiment of the present invention suggests that the spring tongue surface cooperating with the contact tongue after insertion of said contact tongue should be convex in shape. This convex configuration can preferably be provided by shaping the surface of the spring tongue. The convex shape leads to a point-shaped or linear contact between the spring tongue and the contact tongue which normally consists of a flat sheet metal strip. Accordingly, the spring force generated by the spring tongue is transmitted to the contact tongue via a small but defined contact area, and this results in safe and reliable contacting.

According to another preferred embodiment of the present invention, respective spring tongues are formed on opposite sides of the opening. All these spring tongues project into the opening and are preferably connected to a common fixing portion which rests on the surface of the conductor path. The spring tongues are preferably formed such that they are displaced relative to one another and they are provided in an alternating mode of arrangement by cutting them out and bending them away from the sheet metal plane of the semi-finished product so that the respective spring tongues are arranged in front of opposed walls of the opening and clamp the contact tongue between them.

According to a preferred embodiment, the fixing portion rests on the printed circuit board side facing the at least one PTC element, so that, when the contact tongue is being inserted with application of an elastic bias force of the spring tongue, the resultant frictional force will be maintained across the contact area between the fixing portion and the surface of the printed circuit board. Especially, there is no risk that the connection piece, in particular the fixing portion, will be raised from the printed circuit board when the contact tongue is being inserted into the opening.

According to another preferred embodiment of the present invention, the connection piece is provided with at least one holding lug, which is produced by punching and bending the sheet metal strip defining the connection piece. This holding lug projects from the connection piece, normally approximately at right angles thereto, and is in engagement with a fastening hole formed in the printed circuit board. This holding lug allows, on the one hand, an exact positioning of the connection piece during mounting. The connection piece is only mounted at the exact position relative to the printed circuit board, when the at least one holding lug has been brought into engagement with the associated fastening hole.

According to a preferred embodiment, the fastening hole is additionally filled with a solder, and the holding lug is electrically connected to a conductor path of the printed circuit board. The solder is normally in contact with the circumferential surface of the fastening hole, which, in turn, is lined with an electrically conductive coating. The fastening hole should be provided with a copper coating on its circumferential surface, preferably on the inner side thereof, said copper coating providing a good electric connection between the holding lug, the solder accommodated in the fastening hole and a conductor path which is formed on the upper and/or lower surface(s) of the printed circuit board and which is electrically connected to the circumferential coating of the fastening hole.

The holding lug has preferably a width that corresponds approximately to the diameter of the fastening hole. A precise positioning of the connection piece after insertion of the holding lug in the fastening hole is accomplished in this way.

Preferably, the holding lug and an intermediate piece located between the holding lug and the fixing portion are cut out, by punching, in the form of a strip from the metal sheet defining the fixing portion, and that the intermediate piece is formed into a curved protruding shape by bending the strip relative to a contact surface for the fixing portion, said contact surface being defined by the printed circuit board. This development supports this precise positioning of the holding lug in the fastening hole. According to this further development, an intermediate piece, which is implemented such that it is curved relative to the printed circuit board, is provided between the holding lug and the fixing portion that rests on the printed circuit board. The holding lug and the intermediate piece are preferably cut out in the form of a strip by punching the sheet metal defining the fixing portion. The intermediate piece is formed into a curved protruding shape by bending the strip relative to the printed circuit board contact surface provided for the fixing portion. Hence, the strip part projecting from the lower surface of the fixing portion extends preferably at an angle of precisely 90° C. to this lower surface, whereby precise insertion and positioning will be guaranteed while maintaining a planar contact between the fixing portion and the upper surface of the printed circuit board.

The fixing portion is preferably in planar contact with, particularly preferred in full-area contact with a conductor path formed on the surface of the printed circuit board.

Further details and advantages of the present invention can be seen from the following description of an embodiment in combination with the drawing, in which:

DETAILED DESCRIPTION OF THE PREFERRED EMBODIMENTS

Figure 1:
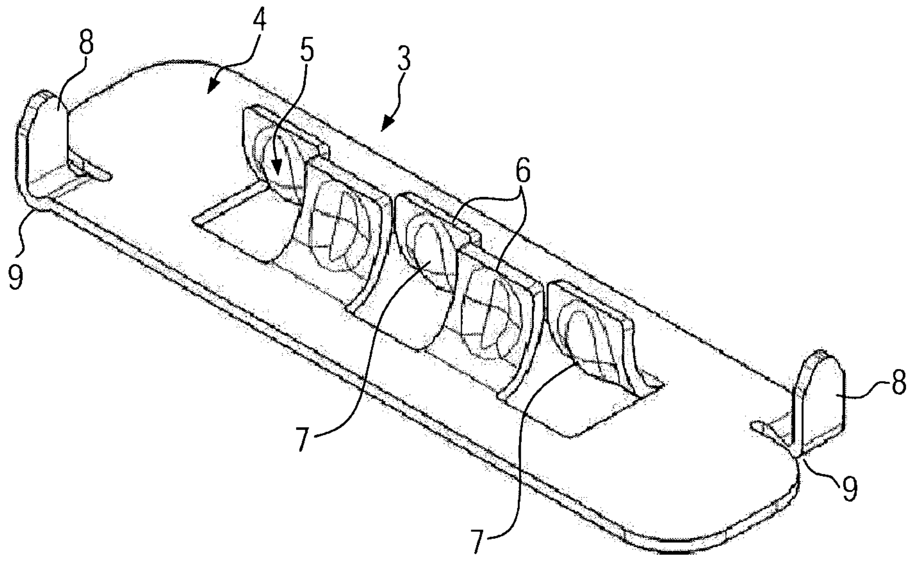
FIG. 1 shows a perspective view of an embodiment of a PCT heating element connection piece.
Figure 2:
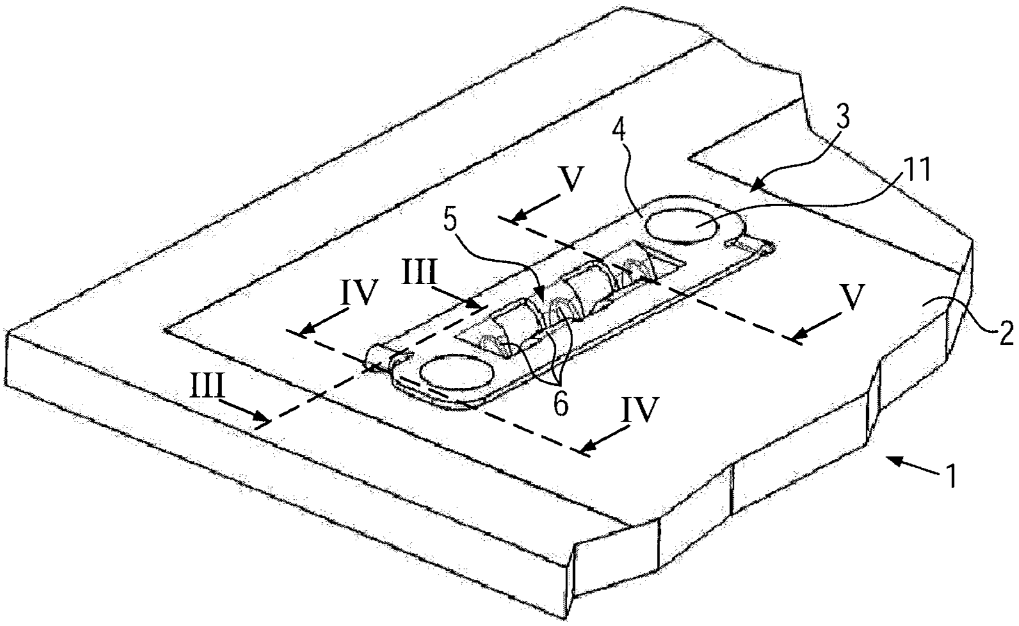
FIG. 2 shows the embodiment according to FIG. 1 in a perspective top view after mounting of the printed circuit board of the PTC heating element.

FIGS. 1 and 2 show perspective views of an embodiment of a connection piece per se (FIG. 1) and after incorporation in a printed circuit board, which is identified by reference numeral 1 and which has provided thereon a conductor path 2 on the upper surface thereof, said conductor path 2 consisting of copper. A connection piece 3 rests on the conductor path 2. The essential components of said connection piece 3 will be explained hereinbelow with reference to FIGS. 1 and 2.

The connection piece 3 is provided with a fixing portion 4 defined by a flat sheet metal strip. In the middle of this fixing portion 4, spring tongues 6 are provided in an alternating mode of arrangement on opposite sides of an elongate opening 5. The spring tongues 6 are formed, by punching and bending, from the sheet metal strip defining the connection piece 3. The spring tongues 6 are all bent towards the lower surface or contact surface of the connection piece 3, which is shown in FIG. 1. Each spring tongue 6 has a contact area 7 bulging convexly so as to form the convex area of the curvature of the spring tongues 6. This contact area 7 projects beyond the curved outer surface of the spring tongue 6 provided in the longitudinal direction of the spring tongue 6. The connection piece 3 has provided thereon holding lugs 8, which are arranged at opposite ends of the connection piece 3 and diagonally relative to one another. Also these holding lugs are produced by punching and bending. In so doing, a strip extending in the longitudinal direction of the sheet metal strip is first cut free from the sheet metal strip defining the connection piece 3. Between the fixing portion 4 and the holding lug 8, this strip is formed into an intermediate piece 9 by bending, said intermediate piece 9 projecting beyond the fixing portion 4 on the outer side thereof in a curved configuration and interconnecting the holding lug 8 and the fixing portion.

As can be seen from the above description, the connection piece 3 is formed exclusively by subjecting a sheet metal strip to punching. The fixing portion 4 defines an area of contact resting on the printed circuit board 1 and, consequently, a flat area allowing accurate positioning and contacting with the printed circuit board. The holding lugs 8 serve to position and fix the connection piece 3 in the printed circuit board and to establish an electric contact between said connection piece and said printed circuit board, in manner that will be described hereinbelow.

The spring tongues 6 of the preferred embodiment of the connection piece and, consequently, also all the elements of said connection piece are preferably made of copper beryllium (BeCu25). For reasons of costs, preferably only the contact areas 7 of the spring are provided with a silver coating having a thickness of 2.5 μm.

FIG. 2 shows the connection piece 3 when it has been arranged on the printed circuit board. The spring tongues 6 are now positioned in an opening 10 (cf. FIG. 5) formed in the printed circuit board and used for receiving therein a contact tongue extending through said opening and defined by a contact metal sheet which is not shown.

In FIG. 2 areas for SMD handling are additionally provided, said areas being identified by rings 11. Via these areas, the connection piece 3 is held and positioned on the printed circuit board during mounting.

Figure 3:
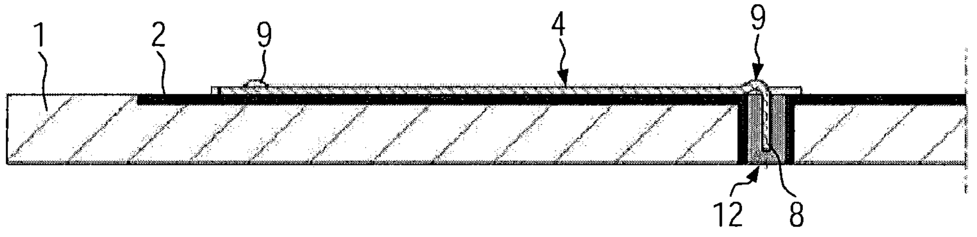
FIG. 3 shows a sectional view along line III-III according to the representation in FIG. 2.
Figure 4:
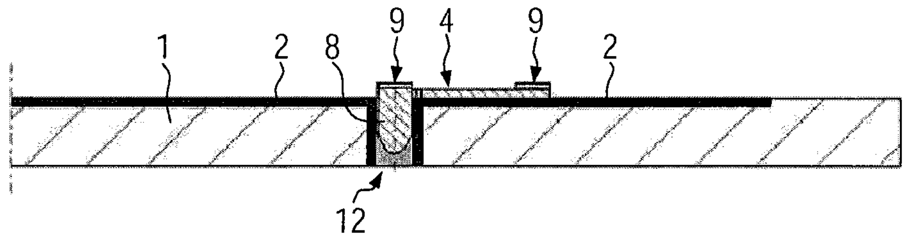
FIG. 4 shows a sectional view along line IV-IV according to the representation in FIG. 2.

As can be seen from FIGS. 2 to 4, the conductor path 2 defines the contact surface for the connection piece 3. The lower surface of the fixing portion 4 is in full area contact with the conductor path 2. The holding lug 8 extends through a fastening hole 12, which is formed in the printed circuit board 1 and which is coated with the material of the conductor paths (copper) on the inner circumferential surface thereof. The holding lug 8 is inserted into this fastening hole 12 and fixed in position therein by means of a solder. A solid electric contact with the conductor path 2 is established in this way and, in addition, the connection piece 3 is thus fixed to the printed circuit board 1. As can especially be seen in FIG. 4, the width of the holding lug 8 corresponds approximately to the diameter of the fastening hole 12, so that, when the holding lug 8 is introduced in the fastening hole 12, the connection piece 3 is fixed very accurately relative to the printed circuit board 1.

Figure 5:
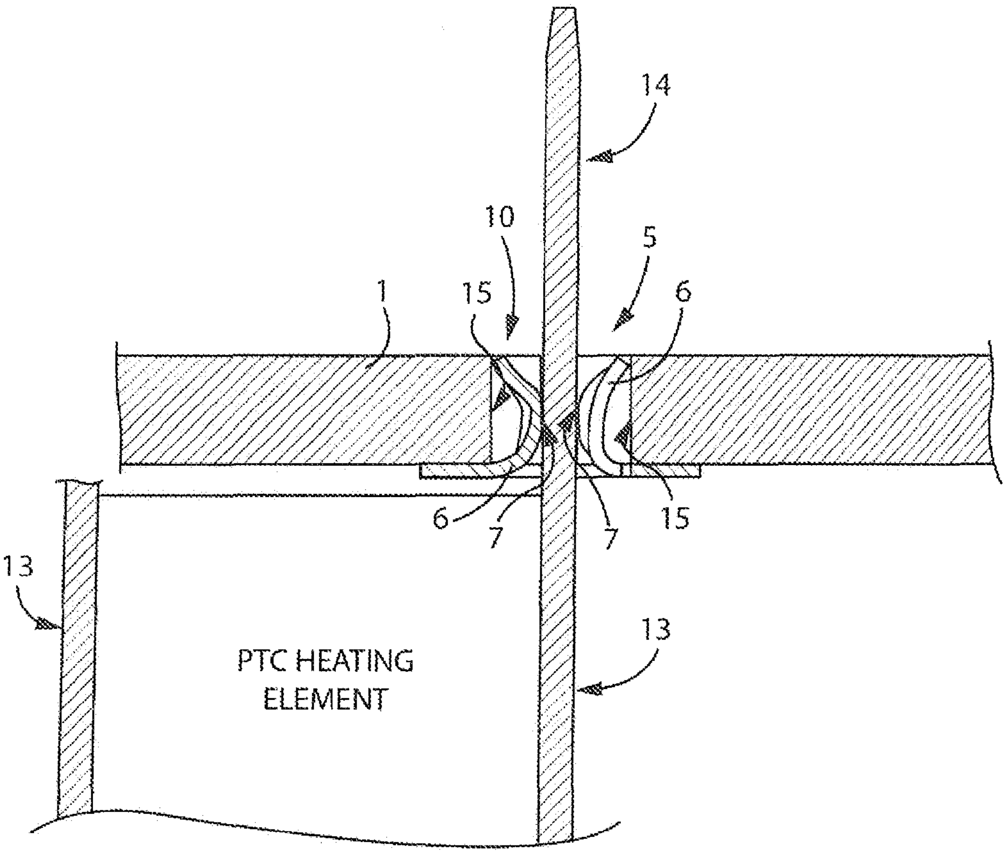
FIG. 5 shows a sectional view along line V-V according to the representation in FIG. 2 with a contact tongue projecting through the printed circuit board.

FIG. 5 shows a sectional view along line V-V according to the representation in FIG. 2 and, consequently, a cross-sectional view through the elongate opening 5 of the printed circuit board 1. It must be imagined that the heat-generating PTC element or elements are arranged such that their respective contact metal sheets are arranged below the printed circuit board 1 with respect to the representation according to FIG. 4. The part of this heat-generating element shown in FIG. 5 is only the end of a contact metal sheet 13, which is implemented as a contact tongue 14. This contact tongue 14 is passed through the opening 10 of the printed circuit board 1, i.e. it projects through the printed circuit board 1. The contact tongue 14 passes through said opening between opposed spring tongues 6, which, due to the contact tongue passing therethrough, are displaced towards the walls 15 delimiting said opening 10. This displacement is caused by resilient bending of the spring tongues 6 at the point where they branch off from the fixing portion 4. The contact tongue 14 only acts on the contact areas 7 of the respective spring tongues 6. When the contact tongue 14 is being inserted between the spring tongues 6, the free ends of these spring tongues 6 are finally brought into contact with the inner wall 15 of the opening 5; this results in an increased spring force, which has the effect that the contact tongue 14 is reliably contacted and press-fitted between the spring tongues 6. Since the insertion of the contact tongue 14 takes place from the printed circuit board side on which the fixing portion 4 of the connection piece 3 abuts, said connection piece 3 is pressed against the lower surface of the printed circuit board 1, when the spring tongues 6 resist the insertion movement of the contact tongue 14 to a certain extent. This kind of contact with the lower surface of the printed circuit board 1 provides a reliable countersupport for the connection piece 3 at any time.

As can be seen in FIG. 5, the spring tongues 6 in their entirety are located within the opening 10, i.e. between the upper and the lower surface of the printed circuit board 1. A very compact structural design is provided through which an electric connection between the contact tongue 14 and the conductor path 2 of the printed circuit board 1 can easily be established. The spring tongues 6 are shaped such that e.g. a contact tongue having the shape of the contact tongue 14 shown in FIG. 4 can also be inserted into the opening 10 from the opposite side and contacted with the printed circuit board 1. All the connection pieces 3 should preferably be mounted on the printed circuit board 1 from the same side. This printed circuit board side, which will be referred to as mounting side in the following, may also be the side carrying exclusively the components fixed to the printed circuit board 1. On the basis of this structural design, the final assembly of the printed circuit board 1 can be executed from one side, i.e. exclusively from the mounting side.

The invention claimed is:

1. An electric heating device for a motor vehicle, comprising:

at least one positive-temperature-coefficient (PTC) heating element with contact metal sheets extending substantially parallel to one another and accommodating between them at least one PTC element, and a printed circuit board having formed therein at least one opening through which a contact tongue projects, the contact tongue being defined by the contact metal sheets and serving to establish an electric connection between the PTC heating element and the printed circuit board, wherein:

a connection piece is connected to a conductor path of the printed circuit board in an electrically conductive manner, said connection piece defining 1) a fixing portion which rests on the printed circuit board, and 2) at least one spring tongue projecting into the opening.

2. An electric heating device according to claim 1, wherein the spring tongue is located substantially within the printed circuit board.

3. An electric heating device according to claim 1, wherein the free end of the spring tongue rests on a wall surrounding the opening.

4. An electric heating device according to claim 1, wherein a surface of the spring tongue cooperating with the contact tongue is convex in shape.

5. An electric heating device according to claim 4, wherein a plurality of spring tongues project into the opening from opposite sides.

6. An electric heating device according to claim 5, wherein the spring tongues are arranged on opposite sides of the opening such that they are displaced relative to one another.

7. An electric heating device according to claim 1, wherein the fixing portion is arranged on the printed circuit board side facing the at least one PTC element.

8. An electric heating device according to claim 1, wherein at least one holding lug projects from the fixing portion, said holding lug being produced by punching and bending and engaging a fastening hole formed in the printed circuit board.

9. An electric heating device according to claim 8, wherein the fastening hole is filled with a solder, and that the holding lug is electrically connected to a conductor path of the printed circuit board.

10. An electric heating device according to claim 8, wherein the holding lug and an intermediate piece located between said holding lug and the fixing portion are cut out, by punching, in the form of a strip from another metal sheet defining the fixing portion, and wherein the intermediate piece is formed into a curved protruding shape by bending the strip relative to a contact surface for the fixing portion, said contact surface being defined by the printed circuit board.

11. An electric heating device according to claim 1, wherein the fixing portion rests on a conductor path, which is formed on the surface of the printed circuit board, in planar contact therewith.

12. An electric heating device for a motor vehicle, comprising:

at least one PTC heating element with contact metal sheets extending substantially parallel to one another and accommodating between them at least one PTC element, and a printed circuit board having formed therein at least one opening through which a contact tongue projects, the contact tongue being defined by a contact metal sheet and which serves to establish an electric connection between the PTC heating element and the printed circuit board, wherein at least one connection piece is connected to a conductor path of the printed circuit board in an electrically conductive manner, said connection piece defining 1) a fixing portion which rests on the printed circuit board, and 2) a plurality of spring tongues projecting into the opening from opposite sides and being arranged on said opposite sides of the opening such that they are displaced relative to one another.

13. An electric heating device according to claim 12, wherein the free end of the spring tongue rests on a wall surrounding the opening.

* * * * *